(12) United States Patent
Orend

(10) Patent No.: US 12,186,991 B2
(45) Date of Patent: Jan. 7, 2025

(54) METHOD FOR GENERATING AN IRRADIATION CONTROL DATA SET FOR AN ADDITIVE MANUFACTURING DEVICE

(71) Applicant: EOS GmbH Electro Optical Systems, Krailling (DE)

(72) Inventor: Jan Orend, Starnberg (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 864 days.

(21) Appl. No.: 17/336,463

(22) Filed: Jun. 2, 2021

(65) Prior Publication Data

US 2021/0379832 A1    Dec. 9, 2021

(30) Foreign Application Priority Data

Jun. 8, 2020  (DE) .......................... 102020115208.6

(51) Int. Cl.
*B29C 64/393*    (2017.01)
*B29C 64/282*    (2017.01)
(Continued)

(52) U.S. Cl.
CPC .......... *B29C 64/393* (2017.08); *B29C 64/282* (2017.08); *B33Y 30/00* (2014.12);
(Continued)

(58) Field of Classification Search
CPC ... B29C 64/393; B29C 64/282; B29C 64/153; B29C 64/277; B29C 64/182; B33Y 30/00; B33Y 50/02; B33Y 10/00; B33Y 50/00; G05B 19/408; G05B 19/4099; B22F 12/90; B22F 10/366; B22F 10/80; B22F 12/45; B22F 10/28; Y02P 10/25; G06F 30/10; G06F 2113/10
(Continued)

(56) References Cited

U.S. PATENT DOCUMENTS

2018/0154598 A1 *   6/2018   Kurtz ..................... A43B 13/04
2018/0272611 A1     9/2018   Cantzler et al.
(Continued)

FOREIGN PATENT DOCUMENTS

DE    102017205051    9/2018
DE    102017205053    9/2018
(Continued)

*Primary Examiner* — Michael J Brown
(74) *Attorney, Agent, or Firm* — Polsinelli PC

(57) ABSTRACT

Disclosed is a method for generating an irradiation control data set for creating control data for a device for additive manufacturing of a number of components in a manufacturing process in which at least one layer of a build material is introduced into a process space and the build material of the layer is selectively solidified to form at least one component layer by irradiating at least one section of the layer using a plurality of irradiation resources, wherein layer data are divided into a plurality of work packages, these work packages are put in an order and an irradiation resource is selected taking into account an execution time determined for the irradiation resource to which one of the work packages is assigned taking into account a specified set of evaluation rules, and this is repeated until to a predetermined termination criterion is reached.

15 Claims, 6 Drawing Sheets

(51) Int. Cl.
  *B33Y 30/00* (2015.01)
  *B33Y 50/02* (2015.01)
  *G05B 19/408* (2006.01)
  *G05B 19/4099* (2006.01)
  *B22F 10/28* (2021.01)
  *B29C 64/153* (2017.01)
  *B33Y 10/00* (2015.01)
  *G06F 30/10* (2020.01)

(52) U.S. Cl.
  CPC ............ *B33Y 50/02* (2014.12); *G05B 19/408* (2013.01); *G05B 19/4099* (2013.01); *B29C 64/153* (2017.08); *B33Y 10/00* (2014.12)

(58) Field of Classification Search
  USPC ........................................................ 700/118
  See application file for complete search history.

(56) References Cited

U.S. PATENT DOCUMENTS

| | | | |
|---|---|---|---|
| 2019/0286384 A1 | 9/2019 | Torrent et al. | |
| 2021/0114111 A1 | 4/2021 | Schade et al. | |
| 2022/0184889 A1* | 6/2022 | Barnes ................... | B33Y 30/00 |

FOREIGN PATENT DOCUMENTS

| | | |
|---|---|---|
| EP | 3036618 | 2/2019 |
| WO | 2016110440 | 7/2016 |

* cited by examiner

METHOD FOR GENERATING AN IRRADIATION CONTROL DATA SET FOR AN ADDITIVE MANUFACTURING DEVICE

TECHNICAL FIELD OF THE INVENTION

The invention relates to a method for generating an irradiation control data set for additive manufacturing of a number of manufacturing products or components in a manufacturing process. In particular, the invention comprises a method for generating an irradiation control data set for creating control data for a device for additive manufacturing of at least a number of components in a manufacturing process in which at least one layer of a build material is introduced into a process space and the build material of the layer is selectively solidified to form component layers by irradiation of at least one section of the layer using a plurality of irradiation resources, e.g. lasers. Furthermore, the invention relates to a corresponding irradiation control data set, a method for additive manufacturing, a corresponding control data generation device, a device for additive manufacturing of a number of manufacturing products, and corresponding control data. A device for additive manufacturing is also referred to hereinafter as a manufacturing device or a machine for short.

BACKGROUND OF THE INVENTION

Additive manufacturing processes are becoming increasingly relevant in the production of prototypes and now also in series production. In general, "additive manufacturing processes" are to be understood as those manufacturing processes in which a manufacturing product or component is built up by adding material, usually on the basis of digital 3D design data. The build-up is usually, but not necessarily, layer-by-layer. The term "3D printing" is also often used as a synonym for additive manufacturing, the production of models, samples and prototypes using additive manufacturing processes is often referred to as "rapid prototyping" and the production of tools as "rapid tooling". As mentioned above, a key issue is the selective solidification of the build material, wherein in many manufacturing processes, this solidification can be carried out with the aid of irradiation with radiant energy, e.g. electromagnetic radiation, in particular light and/or heat radiation, but also, where appropriate, with particle radiation, such as electron radiation. Examples of methods using irradiation are "selective laser sintering" or "selective laser melting". In this process, thin layers of a usually powdery build material are repeatedly applied one on top of one another, and in each layer the build material is selectively solidified by spatially limited irradiation of the locations which, after manufacture, are to form part of the manufactured product to be produced, in that the powder grains of the build material are partially or completely melted with the aid of the energy introduced locally at this location by the radiation. After cooling, these powder grains are then bonded together in a solid.

Many such systems operate with a single irradiation resource, for example a laser unit with a scanner mirror system, with which a laser beam can be moved over a layer for selective solidification. To achieve higher process speeds, it is advantageous to use multiple irradiation resources in parallel. An example of this is described in WO 2016/110440 A1.

In such "multiscanner machines", it has often been the case up to now that to each of the irradiation resources is permanently assigned to a specific area in the process space, i.e. the surface of the respective layer to be processed is divided into fixed areas and each of the irradiation resources is permanently assigned to one of these areas over the entire height of the component to be produced, i.e. in the build direction in the process space across all layers. More than one of the irradiation resources can only be used in a border area, if necessary. For example, in a four-scanner machine, the layer is divided into four quadrants in each case and there is a cross-shaped overlap area, wherein the center is the only place where all four irradiation resources or scanners can operate. Such machines with several irradiation resources are in principle faster than machines with only one irradiation resource, but the fixed assignment of the irradiation resources to certain layer areas has the disadvantage that depending on the component to be produced or the components to be produced in parallel, the various irradiation resources are unevenly utilized and therefore the speed of the buildup of a layer always depends on how much time the irradiation resource needs that is most required in the current layer. Provided that all irradiation resources are set up and arranged in such a way that they could in principle reach any area of a layer within the process space, greater flexibility would in principle be available. However, here too, an irradiation strategy is determined before the start of the production process, in which strategy the irradiation resources are assigned predefined layer areas, thus, for example, divided again into quadrants, purely according to components or similar.

In machines with multiple irradiation resources, some or all components can be irradiated by multiple irradiation units. The irradiation of a layer under selective solidification of component cross-sections should generally take place in the shortest time possible. The division of the areas to be irradiated, the irradiation sequence and the allocation between the work packages and the irradiation resources, e.g. laser/scanner units, all have an influence on the component quality. Conflicting goals often arise, which can delay manufacturing or which can negatively influence certain quality characteristics of the components.

SUMMARY OF THE INVENTION

It is an object of the present invention to provide an improved or alternative control method or control device for a device for additive manufacturing, which preferably offer a possibility for further acceleration of the manufacturing process, and to provide a method and a manufacturing device in which this control is used.

This object is achieved by a method according to claim 1, a corresponding irradiation control data set according to claim 10, by a method for additive manufacturing according to claim 11, by a control data generation device according to claim 12 and by a device for additive manufacturing according to claim 13, control data according to claim 14 and by a computer program product according to claim 15.

The method according to the invention is used for generating an irradiation control data set. This irradiation control data set is in turn used to generate control data for a device for additive manufacturing of a number of components (at least one component, but also multiple components) in a manufacturing process. In such a manufacturing process, at least one layer of a build material is introduced into a process space and solidified into at least one component layer by irradiation of at least one section of the layer. The build material can be pasty or powdery, e.g. a metal-based or polymer-based powder. The solidification takes place selectively using a plurality of irradiation resources, wherein multiple, preferably at least two, further preferably at least three, particularly preferably at least four, irradiation resources are controlled or used.

Thus, at least one component is manufactured from at least one component layer, but usually from a multiplicity of component layers. It is also possible to manufacture multiple components by solidifying their respective component layers in the respective layer of the build material by the irradiation resources at the corresponding points. Each component layer can be divided into layer segments. This subdivision into layer segments can be based on different structures of a component layer (e.g. contour, DownSkin, UpSkin, InFill) or a subdivision of work steps for the creation of the component layer (if a jump occurs, i.e. the respective irradiation resource is switched off and at the same time a target location of the irradiation is relocated, a subdivision occurs). Thus, the layer segments correspond to geometrical arrangements of layered solidifications of a build material or layered geometrical shapes. Each layer segment can be assigned (at least) one "work package". Such a work package is a procedural representation of a layer segment and represents, for example, a set of work steps for creating the corresponding layer segment or an abstract object of this layer segment in a workflow.

For example, a work package can be assigned to a contour of a component. This contour is a layer segment of the outer perimeter of a component, in particular of a closed component cross-section. Other work packages can be assigned to the InFill of the component layer. The term InFill refers to a filling of the component cross-section outlined by the contour. Still other work packages can be assigned to the UpSkin or DownSkin layer segments, each of which is a fill within the contour, but can also be a part of the contour under certain circumstances. In this context, DownSkin is defined as a component area that is to be solidified or is solidified and is adjacent to build material that is not to be solidified or is loose and is placed during the build process below the build material that is to be solidified or is solidified. UpSkin refers to a component area that is to be solidified or is solidified and is adjacent to the build material that is not to be solidified or is loose and is placed during the build process above the solidified build material. Each of the terms contour, InFill, DownSkin, and UpSkin can alternatively or additionally comprise a defined method of selectively solidifying the area so designated, e.g., a characteristic set of irradiation parameter values. A work package can correspond, e.g., to the work-related representation of a contour (the data-related object "contour, component X, layer Y, position") or to the sequence of concrete work steps for creating this contour.

Based on a work package, an irradiation resource can, for example, solidify a complete contour of a component cross-section in a layer, either directly with the work steps provided by the work package or by means of work steps derived from the corresponding work package.

In this context, an irradiation resource is to be understood as a separately controllable beam or radiation emission location. A radiation emission location can also be, e.g., a controllable mirror system (the so-called scanner), i.e., one radiation source supplies several such mirror systems, for example. In principle, however, each irradiation resource can also have its own radiation source with an associated scanner. The use of separate radiation sources for the individual irradiation resources, i.e. for example, the setup of each irradiation resource with its own scanner and its own laser, has the advantage that no beam splitters or the like have to be used and, for example, that the failure of a radiation source does not affect multiple irradiation resources. Nevertheless, in some cases, using a single radiation source for multiple irradiation resources can be advantageous for cost and/or space reasons. Preferred irradiation sources here are light-emitting irradiation sources such as lasers.

A preferred irradiation resource comprises a beam source, such as a laser or electron beam source, capable of producing a beam that can solidify the build material, a scanner, and often an optical device for focusing the beams. A scanner is an optical device that can be used to deflect a beam. A scanner can comprise multiple deflection devices to allow the beam to be deflected along multiple axes. If the beam source is powerful enough and the beams are focused on a specific "point" (i.e., a specific location) on a layer, the build material is melted. By changing the deflection of the scanner, the spot can be moved in the plane of the layer. This can create a trace of melted or sintered build material along the trajectory of this point. This trace is also referred to as a "melt trace." The speed at which the point moves in the plane of the layer is also referred to as the "scan speed".

The component layers or the layer segments are irradiated by the irradiation resource in the form of an irradiation pattern. An irradiation pattern is a geometric arrangement of melt tracks used to traverse or fill a geometric shape. For example, this can be a filling of an area with a line pattern (e.g., for an UpSkin or DownSkin area), or a track along the component surface (e.g., for a contour). This irradiation pattern can be implemented in the form of irradiation parameters. The term "irradiation parameters" is understood to mean an abstract description of an irradiation pattern linked to parameters for generating control commands. These can be constant power specifications and scan speeds, as well as generation instructions specified as functions. Thus, in the context of this application, the term irradiation parameter also comprises specific irradiation parameter values. An irradiation pattern can be a simple method of deflecting the scanner along a trajectory in a feed direction, but can also include a substructure (e.g., a "hatching"). In order to solidify at least one section of the layer, the irradiation site is often moved there according to the control data along a number of scan lines, which are arranged within an irradiation strip, for example like a hatching, which is why these scan lines are also referred to as "hatch lines".

In this context, the term "feed direction" refers to the direction in which the trajectory is/would be traversed without a substructure. Thus, the term is to be understood as the direction of propagation of the solidification along the course of the actually solidified irradiation strip during the production of the component layer. Preferably, the feed of the solidification takes place in a direction along the longitudinal extent of the irradiation strip. In this case, the feed direction describes the propagation or progress of the solidification on a macro-plane, i.e. on the plane of the entire irradiation strip. In particular, the term feed direction does not refer to a micro-plane of solidification, i.e., to the movement of the irradiation site along the individual scan lines within an irradiation strip. In other words, during hatching, a movement of the irradiation site along scan lines on a micro-plane causes the feed of the solidification along the irradiation strip on a macro-plane.

A work package can comprise such irradiation parameters or can include data by means of which irradiation parameters can be generated. For example, a work package includes an abstracted form of travel commands for a scanner and temporally or spatially associated target powers for a radiation source. An irradiation parameter can be assigned to a work package. For a work package, control commands for irradiating a sequence of melt traces can be generated for a specific irradiation resource.

The method according to the invention comprises the following steps:

Providing layer data comprising data for the buildup of layer segments for a component layer.

The layer data comprise data from which control data for the creation of layer segments for a component layer can be determined, in particular irradiation parameters or data from which irradiation parameters can be determined. The layer data can comprise, for example, geometric data, e.g., information about a cross-section of a component, the outline of which is formed by coordinate points in the x/y plane, i.e., a virtual plane parallel to the real build area of the manufacturing device. Each plane or layer carries an individual z-coordinate. Furthermore, the layer data can also comprise directional information for scanning by a beam used for solidification, power/speed of the beam and distance between trajectories, and other data.

b) Dividing the layer data into multiple work packages forming a basic set of the work packages.

Each layer segment is assigned at least one work package, each work package being assigned to a layer segment, but for one layer segment can be assigned multiple work packages. For example, a layer segment can be a continuous contour, in which case it is preferred to assign a work package to this contour. However, a layer segment can also be an InFill of a contour where multiple offsetting occurs (for example, the beam is turned off and the scanner is moved), in which case it is preferred that each part after an offsetting is a separate work package and all such work packages are assigned to the layer segment. As indicated above, a work package can comprise a sequence of commands for controlling a laser and the scanner, or alternatively, an electron beam and a deflection field (i.e. an irradiation resource). Thus, a work package can represent the sequence of commands for a component or a section of a component, e.g., areas with different irradiation patterns or different parameterization (scan speed, power, possibly intensity distribution) can be considered as separate work packages. In the meaning of the method, however, a work package can also be a data-related object that is representative of the aforementioned sequence of commands.

A subdivision of a layer segment into multiple work packages is particularly advantageous if this layer segment should be further subdivided due to the geometric extent and/or processing time, e.g. if in the case of irradiation in the form of a strip pattern, a predetermined maximum strip length is exceeded, or if predetermined working ranges of irradiation resources are exceeded. Preferably, only subdivisions are performed where no continuous scan lines (scan vectors, trajectories) have to be split, i.e. the division is preferably performed at points where the laser is switched off for a jump to the next line scan. This means that in most cases, no shortened scan vectors are created within a strip.

All work packages can initially be part of the basic set of all work packages and are preferably also initially part of the basic set, wherein this basic set can in particular comprise an order of these work packages, e.g. in the form of a directed graph. In the course of the process, this basic set is reduced by work packages, which are then assigned to work package groups and removed from the basic set. This advantageously leads to the fact that layer data in the form of work packages can be distributed to multiple irradiation resources.

c) Providing a firmly defined sequence relation for the work packages.

This sequence relation comprises the order to be followed for different layer segments of a component (e.g. contours first, then DownSkin or UpSkin and finally InFill) and represents in particular general rules for ordering work packages. For the irradiation of different segments (contour, UpSkin, DownSkin, InFill), it can be advantageous to follow a certain order, depending on the material. In particular, for example, an improvement in the surface quality of a component can be achieved if areas on the surface are irradiated or solidified first. This predetermined sequence results in dependencies between the work packages depending on their affiliation to the different areas. A preferred sequence relation can comprise a directed graph which comprises the work sequence of layer segments or rules as to which type of layer segments or work packages must be completed before other layer segments or work packages (e.g. "contour first, then InFill").

d) Specifying a processing sequence of the work packages based at least on the sequence relation.

After this step it is known which work packages have to be executed before other work packages. The step preferably results here in a simple directed graph of the work packages (thus, a graph without loops). This graph can be considered as a new basic set, but it can also be considered as a representation of the basic set for further steps. Preferably, the directed graph is created in addition to the basic set. In particular, this has the advantage that work packages can then be taken into account that have not yet been processed at a point in time relevant to the method but have already been assigned. The assigned work packages can then be deleted from the basic set but can still be present in the graph (and "block" the subsequent work packages). Subsequently, only work packages that are contained in the graph as well as in the basic set can be considered (thus, not the work packages that have not yet been processed as well as the work packages that depend on them). One advantage of the feature is an improvement of component properties, e.g. with respect to surface structure.

e) Determining an (expected) execution time for each of the irradiation resources for the respective work package group of the work packages which have previously been assigned to these irradiation resources.

Each work package group comprises the work packages for an irradiation resource that have already been assigned to the irradiation resource and, if necessary, also waiting times and, of course, can contain no element if no work package has yet been assigned. The execution time is the time required by an irradiation resource to process the work packages and comprises the time required by each of the work packages contained and any additional waiting times that may have been inserted. Usually, the execution times are different for different irradiation resources, but they can also be the same, in particular at the beginning when the execution time is 0.

For determining the execution time, a determination of the respective time required to execute the work packages can be made in advance for each work package or at least for a group of work packages. This is, for example, the time required for irradiation, possibly including jump times between trajectories to be solidified of a work package, during which no irradiation takes place. The time can be estimated beforehand or determined by simulation depending on the assignment of the work packages to the irradiation resources. This step is preferred for the determination of the execution time, however, not absolutely necessary, since this time can in each case also be redetermined again and again from the work package groups.

f) Selecting an irradiation resource taking into account the execution time determined for the irradiation source, preferably the irradiation resource with the respective shortest execution time determined (i.e. the earliest execution time).

Thus, an irradiation resource is selected, preferably the one that is finished first at the respective current status of the distribution of the work packages. If several irradiation resources with the same shortest execution time are possible, one of the irradiation resources can be selected based on other parameters, e.g. randomly, based on the position or the component processed last.

Depending on the determined shortest execution time, a check can be made whether in a manufacturing process all the work packages ordered in step d) can already be processed. For example, it may be the case that a group of work packages cannot be carried out yet at the relevant time because a mandatory preceding work package is still being processed by another irradiation resource and has not yet been completed. The work packages in question can then be removed from the processing sequence or their selection can be blocked. An advantage of the feature is the reduction of the build time due to an improvement in the utilization of the irradiation resources.

g) Determining a selection set of work packages from the basic set of work packages, based on the sequence relation, wherein the selection set comprises those work packages which can be processed according to the processing sequence.

In this step, therefore, those work packages are combined in a selection set which may be processed at all at the relevant time. Preferably, a filtering also takes place to find out whether all necessary work packages could already be processed in a real procedure (see above) or if user specifications exist, which forbid or require a processing of a work package. In this step, further filtering can be performed, e.g. to find out whether work packages of the selected irradiation resource may be processed at all. Thus, the selection set contains those work packages that can be processed at the determined shortest execution time, at least based on the sequence relation. An advantage of the feature is the improvement of the utilization of irradiation resources while maintaining the sequence relation, which in turn leads to an improvement of component properties.

h) Selecting a work package from the selection set in consideration of a specified set of evaluation rules.

In doing so, a single work package can be selected, but also a group of work packages, the selection of a single work package being preferred. The selection is made on the basis of the set of evaluation rules. This set of evaluation rules is used to evaluate work packages with regard to a selection. Thus, a work package which is most suitable is selected from the work set. It is preferred that an individual evaluation value is assigned to the work packages of the selection set on the basis of the set of evaluation rules. This evaluation value can be based, for example, on the degree to which the selected irradiation resource is suited for carrying out the work package in question. However, it can also result from the position of the particular work package in relation to other work packages being processed by other irradiation resources at the present time, and a rating can be given as to the extent to which smoke above the layer will affect the execution of the particular work package. In a very simple case, the set of evaluation rules might specify, "Just take the next work package in the selection set." The selection from the selection set ensures that the work package can also be executed at the present time (at the time of the shortest execution time).

Preferably, for selecting of the most suitable work package for the assignment (based on the evaluation), the different work packages of the selection set are compared with each other. The prerequisite for this is the definition of a comparison operator that allows a statement to be made as to whether the assignment of one work package makes more sense than the assignment of another one. This comparison operator results from the set of evaluation rules. In the simplest case, the comparison can involve two numerical evaluations with each other, but it is also possible to perform this comparison using, for example, a list of priorities or using a classification. If a numerical evaluation takes place, a value can be assigned to the selected work packages according to their evaluation. If the quality of an evaluation is linked to a high value, it is preferred to select the work package with the highest value. If the quality of an evaluation is linked to a low value, the work package with the lowest value is preferably selected.

There are many variants of criteria for a comparison, wherein particularly important criteria can be divided into two groups with regard to their objective. One group relates to criteria for the improvement of component properties, the second group relates to criteria for the reduction of completion time. Preferred criteria for improving component properties are:

position along a flow direction (positions downstream of a current irradiation position receive a worse evaluation than positions upstream of the irradiation position), angle of incidence of the beam of an irradiation resource on the build area of the additive manufacturing device in the working plane (the further the beam deviates from the perpendicular, the worse the evaluation), irradiation direction, in particular the angle between scan trajectory and the vector from the perpendicular base point of the irradiation resource to the respective working point, or the distinction that the irradiation is preferably performed towards the irradiation resource (dragging) or preferably away from it (pushing). The preference for one of these irradiation directions is selected depending on the material, or process, since different materials exhibit different behavior. For example, for an additive manufacturing machine with a laser as the irradiation resource and a steel powder as the build material, a leading laser exposure is preferred because less smoke generation has been observed. However, for other materials, a trailing exposure can also lead to a reduction in the generation of material ejection ("splashes") and thus to an improvement in component properties.

Preferred criteria for reducing build time are:

Number or processing time of the following work packages (the larger the number or the processing time, the better the evaluation) and spatial distance to the work package that previously has been processed by the irradiation resource (the smaller the distance the better the evaluation).

Preferably, criteria with an impact on specific component properties are prioritized higher and may receive a higher weighting. Prioritization within this group is preferably specific to different materials and processes such that the criterion that has the greatest influence on a particular component property is given the highest weighting, i.e., is weighted with a correspondingly high weighting factor and/or is checked first in the nested comparison. For example, some buildup materials react particularly sensitively to the beam incident angle of a laser while for other build materials, a direction of movement of the laser spot on the build material has a greater influence on certain component properties.

As part of the comparison (evaluation), several criteria can be checked in a nested manner. For example, the number of the subsequent work packages that require the work package under consideration can be compared first; if these numbers are equal, the position opposite to the direction of flow is compared. The order of the comparisons defines a prioritization from important to less important criteria. This means that within the evaluation, a first group of (in particular important) evaluation criteria of the set of evaluation rules is preferably used first and in case of two or more equally evaluated work packages having the highest evaluation, these work packages are evaluated with another group of (in particular next more important) evaluation criteria of the set of evaluation rules until only one work package evaluated as the best one or no evaluation criterion is left.

Preferably, different evaluations $B_i$ of individual criteria are combined by a value to an evaluation $B:=B(B_0, B_1, \ldots, B_N)$, where N is the number of criteria. In particular, this is a linear combination, e.g. $B(B_0, \ldots, B_N)=$sum $(W_i*B_i)$, where $W_i$ are weighting factors.

Both methods can also be combined by using the numerical evaluation in a nested comparison. An advantage of the feature is that the build time or the component quality can be improved. In addition, the preferred implementation does not require computationally intensive iterative optimization.

i) Assigning the selected work package to a work package group which is assigned to the currently selected irradiation resource and removing this work package from the basic set of work packages.

Thus, the selected work package is assigned to an irradiation resource. Since the whole method can be done in advance of a machining operation and is not necessarily linked to a specific machine (only the number and positioning of the irradiation resources relative to each other and relative to the build area should be identical in each case), it is only necessary to assign the selected work package to a work package group, which in turn is assigned to the selected irradiation resource. Thus, a data set of work package groups is obtained which contain work data for the respective irradiation resources of a device for additive manufacturing of a number of components.

To prevent work packages from being assigned twice, the respectively assigned work packages are deleted from the basic set. This means that when the method is carried out again with the modified basic set, the work packages are usually processed in different sequences for each run.

j) repeating at least steps d) to i) until a predetermined termination criterion is reached. A preferred termination criterion is the number of work packages allocated or remaining, with a preferred termination condition providing for distribution of all work packages. It is also possible to include more of the specified steps or additional steps may in the repetition, it being preferred not to perform steps multiple times if their result does not change.

An irradiation control data set according to the invention has been generated by means of a method according to the invention. The data set preferably contains work package groups with work packages for the individual irradiation resources. The irradiation control data set may already comprise concrete irradiation parameters or only abstract work packages from which irradiation parameters can be derived.

A method according to the invention for additive manufacturing of at least one component layer of at least one component, comprises the steps:
  introducing a layer of a build material into a process space;
  selectively solidifying the build material of the layer by irradiating at least one section of the layer by means of a plurality of irradiation resources,
  controlling the irradiation resources by means of control data generated using an irradiation control data set according to the invention.

A control data generating device according to the invention for generating an irradiation control data set for creating control data for an additive manufacturing device for additive manufacturing of at least a number of components in a manufacturing process in which at least one layer of a build material is introduced into a process space and the build material of the layer is selectively solidified to form component layers by irradiating at least one section of the layer using a plurality of irradiation resources, comprising an allocation unit adapted for:
  a) processing of provided layer data comprising data for building layer segments for a component layer,
  b) dividing the layer data into several work packages thereby forming a basic set of the work packages,
  c) providing a firmly defined sequence relation for the work packages,
  d) specifying a processing sequence of the work packages based at least on the sequence relation,
  e) determining an execution time for each of the irradiation resources for the respective work package group of the work packages which have already been assigned to these irradiation resources before,
  f) selecting an irradiation resource taking into account the execution time determined for irradiation resource, preferably the irradiation resource with the respective shortest execution time determined,
  g) determining a selection set of work packages from the basic set of work packages, based on the sequence relation, the selection set comprising those work packages which can be processed according to the processing sequence,
  h) selecting a work package from the selection set, taking into account a specified set of evaluation rules,
  i) assigning the selected work package to a work package group which is assigned to the currently selected irradiation resource and removing this work package from the basic set of work packages,
  j) repeating at least steps d) to i) until a predetermined termination criterion is reached.

A device according to the invention for additive manufacturing of at least one component layer of at least one component in an additive manufacturing process comprises at least one supply device for introducing a layer of a build material into a process space, a plurality of irradiation resources for selectively solidifying the build material of the layer by irradiating at least one section of the layer, and a control data generation device according to the invention.

Control data according to the invention for controlling an additive manufacturing device are configured to control the additive manufacturing device such that manufacturing of a component is carried out using a method according to the invention, and/or wherein the control data has been generated using an irradiation control data set according to the invention.

The invention may be implemented in the form of a computer unit with suitable software. This applies in particular to the control data generation device, which may be implemented in the form of suitable software program parts in the computer unit. For this purpose, the computer unit can have, for example, one or more cooperating microprocessors or the like for this purpose. A largely software-based implementation has the advantage that control devices already in use can also be retrofitted in a simple manner by means of a software or firmware update in order to operate in the manner according to the invention.

In this respect, the object is also achieved by a corresponding computer program product with a computer program which can be loaded directly into a storage device of a computing device (in a control data generation device and/or a control device of a device for additive manufacturing of a component layer of a component), with program sections to execute all steps of the method according to the invention when the program is executed in the computing device. Such a computer program product can comprise, in addition to the computer program, additional components, such as documentation and/or additional components, including hardware components, e.g., hardware keys (dongles, etc.) for use of the software, if needed. A computer-readable medium, for example a memory stick, a hard disk or another transportable or permanently installed data carrier, on which the program sections of the computer program that can be read in and executed by a computer unit of the control device or inspection device are stored, can serve for transport to the control device and/or for storage on or in the control device or inspection device.

Further, particularly advantageous configurations and further developments of the invention arise from the dependent claims as well as the following description, wherein the independent claims of one claim category can also be further developed analogously to the dependent claims and exemplary embodiments of another claim category and, in particular, individual features of different exemplary embodiment or variants can also be combined to form new exemplary embodiments or variants.

According to a preferred method, the work packages additionally comprise defined irradiation parameters, which can be information about the guidance or type of irradiation, but also explicit assignments to irradiation resources. The preferred method additionally comprises the following steps:

Providing an assignment relation for assigning irradiation parameters to irradiation resources.

This assignment relation preferably comprises decision criteria as to whether an irradiation resource meets the requirements for the irradiation parameters, e.g., whether the required type of radiation, energy, frequency, or intensity can be provided. However, in a simple case, the assignment relation may check, only, whether the particular irradiation resource is explicitly specified in the irradiation parameters or whether it has been excluded.

Filtering the selection set of work packages based on the assignment relation and irradiation parameters depending on the selected irradiation resource.

In this step it is decided whether it is actually possible that the work packages can or may be assigned to the selected irradiation resource according to the assignment relation and the irradiation parameters. If not, the work package in question is deleted from the selection set or not included in the selection set in the first place. Preferably, at least the second of these steps is performed after applying the sequence relation. In another preferred embodiment, an application occurs before that. However, the steps can also be part of step i), i.e., considered in the form of the evaluation. An advantage of this further development of the method according to the invention is an improvement of component properties; it is possible to distinguish between different irradiation resources, which can have, e.g., a different power spectrum, a different beam diameter, or a different intensity distribution.

According to a preferred method, the set of evaluation rules comprises an evaluation for at least one criterion of the group spatial distance of the work package to the selected irradiation resource (e.g., by determining the perpendicular base point of the exit point of a laser beam from the optics, where the perpendicular base point is located in the working plane or on the build area), number of work packages depending on the execution of the work package, position of the work package relative to a spatial extent of a determined or predefined smoke extraction area, spatial distance of the work package to a previously assigned work package, duration of the work package, which require the work package in question, spatial distance of beams of irradiation resources from each other.

Preferably (based on this set of evaluation rules), an evaluation value is calculated in each case, the set of evaluation rules being configured in such a way that it assigns a numerical value to the at least one criterion. Particularly preferably, different criteria are additionally assigned different weightings, or the set of evaluation rules assigns different numerical weightings to criteria.

Thus, for example, a work package whose execution at the relevant time (in the shortest execution time) lies outside of an expected smoke plume, which arises during the execution of another work package by another radiation resource, is assigned a better evaluation (e.g. a higher evaluation value) than work packages whose execution lies in this smoke plume.

An advantage of taking into account the spatial distance of the work package to the selected irradiation resource is that, for example, a reduction of smoke generation and an improvement of component properties can be achieved.

An advantage of taking into account the location of a work package relative to the extent/location of a smoke plume area is that irradiation of an area shaded by smoke can be avoided, which can result in an improvement of component properties (e.g., reduced porosity and/or improved mechanical properties of the component).

An advantage of taking into account the spatial distance of the work package to a previously assigned work package is that a reduction in build time by reducing jump distances of an irradiation resource between the areas of different work packages and thus a reduction of unproductive completion time can be effected. In addition, an improvement in component properties can be effected by continuing a solidification process adjacent to a previously solidified area that is still warm.

One advantage of taking into account the number of work packages that require the work package in question is that this can lead to a reduction in completion time.

The last point of the criteria is particularly important when using electron beams. The electron beams must not be too close to each other as their electric fields can have a negative effect on each other. However, using light beams can also cause local temperature distributions which can have a negative effect on each other.

According to a preferred method, it is checked whether the selected work package can also be irradiated by another irradiation resource and whether this other irradiation resource is better suited for executing the work package with respect to a predetermined criterion, in particular with respect to an angle of incidence (on the build area) or angle of deflection of a beam of the irradiation resource and/or distance to the work package. This can be decided simply on the basis of the position at which the work package is to be carried out. In the case that the other irradiation resource is more suitable, the other irradiation resource is declared to be the selected irradiation resource and the selected work package is assigned to a work package group which is assigned to this (new) currently selected irradiation resource.

Within the scope of this preferred embodiment, the execution times of the respective irradiation resources without the respective work package are preferably additionally compared with each other. A change of the selected irradiation resource takes place only in the case if the respective execution times differ at most by a specified time period. Thus, the change between the irradiation resources takes place only if the difference of execution times $\Delta t$ ($=t_{execution}(X)-t_{execution}(Y)$) of both irradiation resources is smaller than a specified value $t_{tolerance}$. This means that in the worst case, the completion time can increase by $\Delta t$, due to this one allocation. However, the assignment does not necessarily have to affect this time difference since the change can result in time savings. However, instead of using $t_{tolerance}$, a budget for the entire layer could be used for the specified time period and the completion time could be simulated with and without the change. This could in turn be made dependent on a layer-specific minimum layer time which is necessary in order not to exceed a specified substrate temperature (e.g. the temperature of the surface of the build material). This minimum layer time can be calculated by a thermal simulation or determined by a temperature measurement of the build area. An advantage of this further development of the method according to the invention is an improvement of component properties due to a locally more favorable angle of incidence of the beam on the build material or a more advantageous irradiation direction for certain component properties.

According to a preferred method, the set of evaluation rules comprises a cost function and the evaluation, in particular evaluation values, of the work packages are determined in the course of an optimization of this cost function. This cost function preferably comprises a completion time and/or execution times and/or criteria and/or a relevance assignment according to the above-mentioned set of evaluation rules and/or a predetermined criterion according to the previously described selection of another irradiation resource.

In this case, the evaluation (in particular a determination of the evaluation values) is preferably carried out by means of an iterative optimization of an operating plan, in particular by means of an optimization of the completion time.

When the currently selected work packages are evaluated according to the evaluation rules as described above, a decision is made in each case that can affect the decision options in the subsequent assignments. However, how good this decision was can basically not be estimated before the entire layer has been calculated. A preferred optimization algorithm computes a set of evaluations and decisions resulting therefrom for each iteration and thus the assignment to the work package groups (the irradiation units) and the chronological sequence for the entire layer. The result is then evaluated using a cost function. For the first iteration, these decisions can basically be made arbitrarily, but preferably based on the set of evaluation rules. To generate further solutions and thus sets of decisions, different algorithms are known, for example genetic algorithms that combine the decision from previous iterations. This is also referred to as combinatorial optimization. An advantage of this further development of the method according to the invention is that an optimized operating plan can be determined by means of the cost function, whereby build time and component properties can be improved, but at the cost of a required computing time.

According to a preferred method, specifying the processing sequence of the work packages (see step d) above) is additionally carried out according to a user specification. Preferably, only user specifications are considered (or only such user defaults are permissible) which satisfy the sequence relation. In doing so, the user specification preferably comprises a specification for a feed direction and/or a specification for an assignment of an irradiation resource to a (concrete) component. Thus, the respective component is substantially manufactured completely or defined parts of the component are substantially manufactured by the respective irradiation resource. An advantage of this further development of the method according to the invention is an improvement of component properties in certain areas, in that no change of the irradiation resource takes place, provided that the latter has been assigned by the user, as well as the possibility that special requirements or specifications of an operator can be taken into account.

A preferred method comprises the steps:

Determining whether work packages of the selection set and work packages already assigned to the currently selected irradiation resource have an affiliation with the same component, and if so, creating a new selection set comprising the determined work packages of the selection set that have the respective affiliation.

Thus, it is examined whether already selected work packages serve for processing the same component as (already sorted) work packages of the work package group of the currently selected irradiation resource. These work packages are then assigned to the current selection set or the rest of the work packages is deleted from the original selection set. These steps can also be processed in connection with the evaluation or be part of the set of evaluation rules. However, it is preferred to filter the selection set in this way prior to the evaluation. An advantage of this further development of the method according to the invention is a small number and/or are smaller distances of jumps between the areas of work packages so that a reduction of the completion time goes along. In addition, there is now also a possibility of continuing the irradiation at a location that is still warm and thus a potential improvement of component properties.

According to a preferred method, in order to determine the processing sequence, the work packages are arranged, based on the sequence relation, in a simple directed graph. In this graph, the work packages are present as nodes and their relation (work sequence) to each other are present in the form of directed edges according to the sequence relation. When determining the selection set of work packages from the basic set of work packages, only those work packages are preferably used for the processing of which no work package of the graph has to be processed beforehand. In relation to the graph, this means that no work package to which an edge leads is included in the selection set. Thus, start nodes are always selected or, respectively, no successors are selected. It is preferred here that the basic set of work packages is or includes the directed graph. The graph always represents the state at the time of the assignment. Preferably, it is determined whether work packages are being executed and have not yet been processed at a time of manufacture which corresponds to the shortest execution time. Successors of these work packages are preferably not yet included in the selection set. An advantage of this further development of the method according to the invention is that the sequence relation can be considered, which can lead to an improvement of component properties.

According to a preferred method, in the case that no work packages can be found for the selected irradiation resource, but work packages that have not yet been processed are available, a predetermined waiting time is assigned to the selected irradiation resource in place of a work package. No work package is then deleted from the basic set and at least the repeated steps of the procedure are performed again. The waiting time is preferably predetermined in terms of a time value or is calculated dynamically based on criteria (e.g. processing by the other irradiation resources). It is preferred that the duration of the waiting time is such that at least one further work package is completed by another irradiation resource during this time. An advantage of this further development of the method according to the invention is that the sequence relation is fulfilled.

A preferred simple structure of a processing sequence, in particular of a directed graph, can be done on the basis of pure affiliation to specific areas. The input is a list containing layer segments in the desired order, from which all layer segments starting with the second entry in the list are considered. For each work package belonging to the previous layer segment (therefore starting with the second layer segment), a dependency on all work packages belonging to the currently considered layer segment is added in the processing sequence.

A preferred further structure of a processing sequence, in particular of a directed graph, in which the relations are restricted to topologically connected regions, can be achieved as follows. The advantage of such a processing sequence is that the number of dependencies between the work packages is reduced, so that there are more possibilities to divide the work packages among the irradiation resources. Similar to the previous simple structure, individual layer segments are considered from a list in which layer segments are contained in the desired order and all layer segments starting with the second entry in the list are looped. For each first work package that belongs to the considered segment, work packages from the previous segment that are adjacent to the first work package are determined. For all adjacent work packages, a dependency on the first work package is added in the processing sequence. In particular, a list of adjacent precursors of work packages is used.

In terms of the irradiation sequence, there may be other preferences that may be in conflict with the already specified relative sequence between the work packages. For example, to avoid laser/smoke interactions, it can be required that the work packages be irradiated in the direction against the flow direction. The following features could be part of the set of evaluation rules, but they could also be used for forming the processing sequence.

FIG. 9 shows a flowchart of an exemplary embodiment for creating another processing sequence, for another directed graph GG. This flowchart describes an algorithm that adds dependencies for work packages in an area potentially shaded by smoke, if no contradiction results therefrom. The input is a basic set with all work packages and the processing sequence (e.g. the directed graph) which already contains all mandatory dependencies, e.g. due to the irradiation sequence of the layer segments. For each first work package, all work packages potentially shadowed by smoke during the irradiation of the first work package are determined.

The process then goes through all work packages shadowed by smoke, and it is checked for each work package whether prior irradiation of the first work package is required. Only if this is not the case, a dependency of the first work package on the respective work packages is added to the processing sequence (e.g. the graph).

An advantage of the invention is a particularly high productivity (short build time) due to a more uniform utilization of all irradiation resources and, at the same time, a firm adherence to a specified relative irradiation sequence between the layer segments (contour, DownSkin, UpSkin, infill, etc.), and a resulting improved component quality (e.g. e.g. with respect to the mechanical properties of the component, such as its fracture or tensile strength, but also with respect to its surface finish), which is further improved in particular by the preferred minimization of changes in irradiation resources, in particular on the component surface. Moreover, in a preferred embodiment, there is an assignment of the most suitable irradiation resource (e.g., the laser with the most favorable incident angle on the build material), adherence to a preferred irradiation direction relative to the position of the scanner, adherence to a preferred irradiation direction relative to the laminar flow, and avoidance of smoke-laser interactions.

BRIEF DESCRIPTION OF THE DRAWINGS

The invention is explained again in more detail below by means of exemplary embodiments with reference to the attached figures. It is to be noted again that in the following description of figures, for the sake of simplicity, a manufacturing method according to the invention for at least one component layer in a manufacturing process is described, wherein the device for additive manufacturing is controlled by control data generated according to a method for generating control data according to the invention. Furthermore, it is assumed that there is only a single component layer to be manufactured or a single component, without limiting the invention thereto. In this connection, identical components are provided with identical reference numerals in the various figures. The figures are generally not to scale. In the figures.

DETAILED DESCRIPTION OF THE EMBODIMENTS

The following exemplary embodiments are described with reference to a device 1 for additive manufacturing of manufactured products in the form of a laser sintering or laser melting device 1, wherein it is explicitly pointed out once again that the invention is not limited to laser sintering or laser melting devices. The device will therefore be referred to hereinafter—without any limitation of generality—as "laser sintering device" 1, in short, and the term "exposure" will be used synonymously with the term "irradiation".

Figure 1:
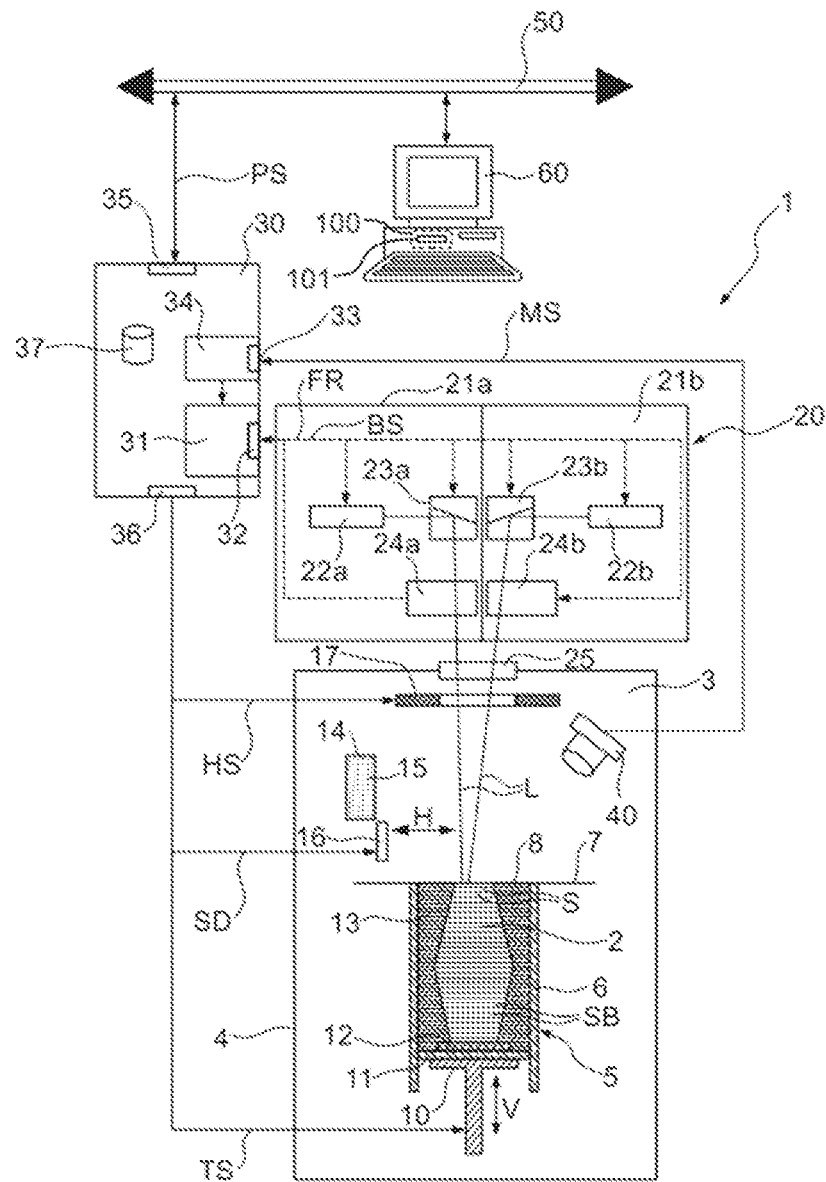
FIG. 1 shows a schematic view, partially shown in cross-section, of an exemplary embodiment of a device according to the invention for additive manufacturing of manufactured products.

Such a laser sintering device 1 is shown schematically in FIG. 1. The device has a process chamber 3 or a process space 3 with a chamber wall 4 in which substantially the manufacturing process takes place. An upwardly open container 5 with a container wall 6 is located the process chamber 3. The upper opening of the container 5 forms the respective current working plane 7. The area of this working plane 7 lying within the opening of the container 5 can be used to build up the object 2 and is therefore referred to as the build area 8.

The container 5 has a base plate 11 movable in a vertical direction V, which is arranged on a support 10. This base plate 11 closes off the container 5 at the bottom and thus forms the bottom thereof. The base plate 11 can be formed integrally with the support, but it can also be a plate formed separately from the support 10 and fixed to the support 10 or simply mounted thereon. Depending on the type of specific build material, i.e. for example, the powder used, and the manufacturing process, a build platform 12 can be attached to the base plate 11 as a build base on which the object 2 is built up. In principle, however, the object can also be built up on the base plate 11 itself, which then forms the build base.

The basic build of the object 2 is carried out in such a way that a layer of build material 13 is first applied onto the build platform 12, then a laser is used to selectively solidify the build material at the points which are to form parts of the object 2 to be manufactured, then the base plate 11, thus the build platform, is lowered by means of the support 10 and a new layer of the build material 13 is applied and then selectively solidified, etc. The working plane 7 located in the build area 8 then corresponds in each case to the current layer.

In FIG. 1, the object 2 built up on the build platform 12 in the container 5 is shown below the working plane in an intermediate state. It already has multiple solidified layers S, surrounded by build material 13 which has remained unsolidified. Various materials can be used as build material, preferably powder, in particular metal powder, plastic powder, ceramic powder, sand, filled or mixed powders or also pasty materials.

Fresh build material 15 is arranged in a storage container 14 of the laser sintering device 1. With the aid of a coater 16 movable in a horizontal direction H, the build material can be applied in the form of a thin layer in the working plane 7 or within the build area 8.

Optionally, an additional radiation heater 17 is arranged in the process chamber 3. It can be used to heat the applied build material 13 so that the irradiation device used for selective solidification does not have to introduce too much energy. That is, a quantity of basic energy can already be introduced into the build material 13, for example with the aid of the radiation heater 17, which basic energy is of course still below the necessary energy at which the build material 13 melts or sinters. For example, an infrared heater can be used as the radiation heater 17.

For selective solidification, the laser sintering device 1 has an irradiation device 20 or, specifically, an exposure device 20 comprising a plurality of irradiation resources 21a, 21b.

In FIG. 1, only two irradiation resources 21a, 21b are schematically shown. However, the device preferably comprises further irradiation resources, preferably at least four irradiation resources. In terms of the basic principle, the individual irradiation resources 21a, 21b can be constructed in the same way, as shown here as an example in FIG. 1. In this case, each irradiation resource 21a, 21b has its own laser 22a, 22b as radiation source 22a, 22b, which generates its own laser beam L. This laser beam L is deflected in each case by its own deflection device 23a, 23b (also called scanner 23a, 23b). This deflection device 23a, 23b can be a controllable mirror system. Furthermore, each laser beam L is then suitably focused on the working plane 7 by a focusing device 24a, 24b, which is also assigned to the irradiation resource 21a, 21b. The entire irradiation device 20 is located here outside the process chamber 3, and the laser beams L are each directed into the process chamber 3 via a coupling window 25 provided in the chamber wall 4 on the upper side of the process chamber 3.

The lasers 22a, 22b can be gas or solid state lasers or any other type of laser such as laser diodes, in particular VCSEL (Vertical Cavity Surface Emitting Laser) or VECSEL (Vertical External Cavity Surface Emitting Laser). The lasers 22a, 22b can be of the same type, but can also have be constructed differently. Furthermore, it is not mandatory that all irradiation resources 21a, 21b are constructed in the same way.

The laser sintering device 1 further includes a sensor arrangement 40 which is suitable for detecting a process radiation emitted during the impingement of the laser beams L on the build material 13 in the working plane 7. This sensor arrangement 40 operates spatially resolved, i.e. it is capable of detecting a type of emission image of the respective layer S. Preferably, an image sensor or a camera which is sufficiently sensitive in the range of the emitted radiation is used as the sensor arrangement 40. Alternatively or additionally, one or more sensors for detecting an optical and/or thermal process radiation could also be used, e.g. photodiodes which detect the electromagnetic radiation emitted by the incident laser beam L, or temperature sensors for detecting an emitted thermal radiation. It would be possible to assign the signal of a sensor, which itself does not have spatial resolution, to the coordinates in that the coordinates used for controlling the laser beam are in each case assigned to the sensor signal in a chronological manner. In FIG. 1, the sensor arrangement 40 is located inside the process chamber 3. However, it could also be located outside the process chamber 3 and then detect the process radiation, for example, through another window in the process chamber 3.

The measurement signals MS detected by the sensor arrangement 40 are transmitted here to a control device 30 of the laser sintering device 1, which is also used to control the various components of the laser sintering device 1 for overall control of the additive manufacturing process. For this purpose, the control device 30 has a measurement signal interface 33 at which the measurement signals MS from the process chamber 3 are received. The measurement signals can then be evaluated by a measurement signal evaluation unit 34 to determine whether faults have occurred within the manufacturing process, for example to determine, in the case of simultaneous manufacture of several components, if further completion of one of the components is no longer useful because, taking into account the measurement signals MS, it is to be expected that this component is a reject anyway.

The control device 30 here has an online control strategy modification unit 31 which can control each of the components of the irradiation device 20 separately, i.e. in this case, the individual irradiation resources 21a, 21b and their individual components, namely the lasers 22a, 22b, the deflection device 23a, 23b and the focusing devices 24a, 24b, by means of suitable irradiation control data BS. In doing so, the control strategy modification unit 31 outputs the current irradiation control data BS to the components of the irradiation resources 21a, 21b such that they follow a defined irradiation strategy ST, said irradiation strategy ST being specified by the irradiation data set BD according to the invention. Outputting the irradiation control data BS is carried out here via a data interface 32 via which each of the individual irradiation resources 21a, 21b or their components can also transmit functional feedback messages FR to the control device 30 or, in this case, the control strategy modification unit 31. Through a control interface 36, the control device 30 can also control the radiation heater 17 by means of suitable heating control data HS, the coater 16 by means of coating control data SD, and the movement of the support 10 by means of support control data TS.

Here, the control device 30 also has an interface 35 via which the entire device 1 can be coupled to a terminal 60 having a display or the like, in this case via a bus 50 or another data connection, for example Via this terminal 60, an operator can control the control device 30 and thus the entire laser sintering device 1. Likewise, however, the device 1 could also be controlled via a user interface (not shown) integrated into the control device 30. In particular, process control data PS, which may include irradiation control data BS according to an irradiation strategy ST, heating control data HS, coating control data SD, or support control data TS could be transmitted to the control device 30 by means of the terminal 60, for example via the bus 50. The irradiation strategy ST is specified in this case by the irradiation control data set BD according to the invention. The process control data PS can in particular also be stored in a storage 37 of the control device 30 for further use. A possible structure of an irradiation strategy ST is yet to be explained below with reference to FIG. 2.

In this exemplary embodiment, the terminal 60 comprises a control data generation device 100 according to the invention. The latter is used to create, from computer-generated 3D objects which have previously been decomposed slice by slice, an optimized irradiation control data set BD from which correspondingly optimized process control data PS for the laser sintering device can be created. This control data generation device 100 as well as a method for creating a corresponding irradiation control data set BD is described below with reference to exemplary embodiments.

It is noted here again that the present invention is not limited to such a laser sintering device 1. It can be applied to any other method for generative or additive manufacturing of a three-dimensional object by layer-by-layer application and selective solidification of a build material, wherein for solidification, multiple energy beams are emitted from separately controllable irradiation resources onto the build-up material to be solidified. Accordingly, it is also possible that the irradiation resources are constructed not only with lasers as described herein, but any irradiation resource could be used with which energy can be selectively delivered as wave or particle radiation onto or into the buildup material. For example, other light sources, electron beams, etc. could be used instead of lasers.

Although only a single object 2 is shown in FIG. 1, it is possible and usually also is common to produce multiple objects in parallel in the process chamber 3 or in the container 5. For this purpose, the build material is scanned layer by layer by the energy beam at locations corresponding to the cross-sections of the objects in the respective layer.

In order for the method to be applied, the component 2 (or the simultaneously manufactured components 2) must first be divided into component layers and further into layer segments. These layer segments (geometric objects) are always assigned a single work package (representation of the layer segment or sequence of build steps) or a plurality of work packages.

Figure 2:
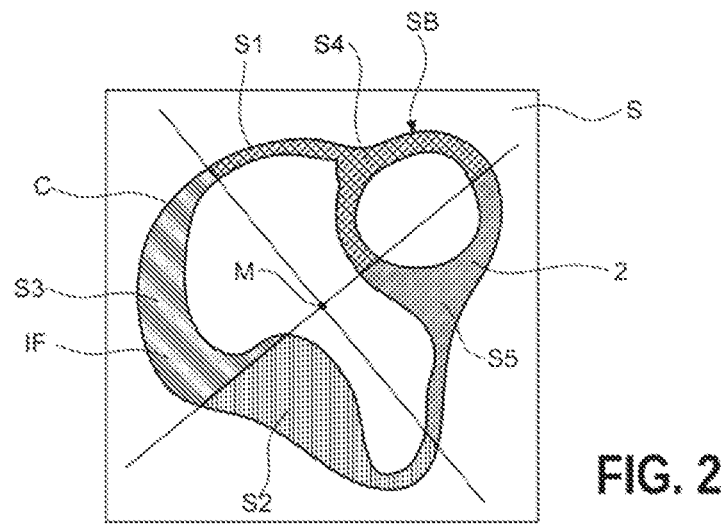
FIG. 2 shows a schematic illustration of an assignment of layer areas of a layer to different irradiation resources according to an exemplary embodiment of the method according to the invention.
Figure 3:
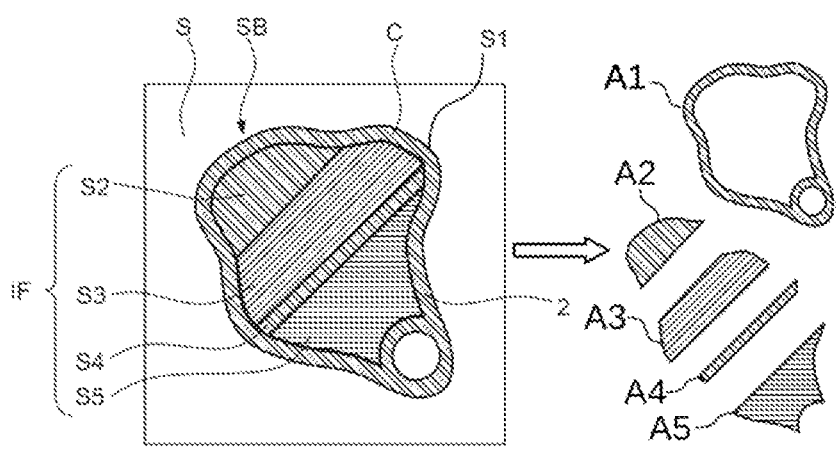
FIG. 3 shows a schematic illustration of an assignment of layer areas of a layer to different irradiation resources according to another exemplary embodiment of the method according to the invention.

FIG. 2 shows the allocation of the cross-sectional area of a component 2 (component layer SB) in a layer S to the various irradiation resources in such a way that the partial cross-sectional areas are allocated as evenly as possible to the irradiation resources. In FIG. 3, the total cross-sectional area is divided into four segments by two parting lines running through the area centroid M. The component layer SB comprises an outer contour C, which is regarded here as a single layer segment S1, and a fill (InFill IF), which is divided into four layer segments S2, S3, S4, S5. Within the irradiation strategy, the layer segments S1, S2, S3, S4, S5 can then be created by different irradiation resources by means of solidification of build material.

FIG. 3 shows another possible division of the cross-sectional area of a component 2 (component layer SB) in a layer S into layer segments S1, S2, S3, S4, S5. In this component 2, in contrast to FIG. 2, the contour C is not shown as a thick line, but as a hatched area. In this example, the InFill IF is subdivided, e.g. into areas in the transition of which the radiation is switched off. The solid lines within the InFill IF are not part of the component, but represent virtual boundaries between the layer segments S2, S3, S4, S5. On the right, the assignment of the layer segments S1, S2, S3, S4, S5 to work packages A1, A2, A3, A4, A5 is indicated. However, it should be noted that in general the representation of the layer segments S1, S2, S3, S4, S5 is not done in the form of geometric objects (although this is also possible), but as abstract objects or irradiation parameters or build steps. The method according to the invention works with the work packages A1, A2, A3, A4, A5.

Figure 4:
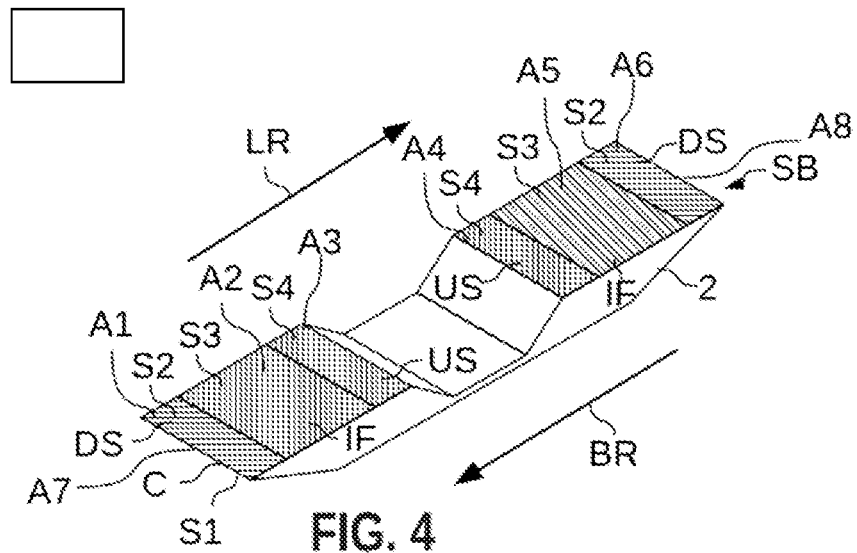
FIG. 4 shows a schematic illustration of a component layer for illustrating the structure of a directed graph.

FIG. 4 shows a schematic illustration of a component layer SB to illustrate the structure of a directed graph (see also the following explanations). The component 2 has a V-shaped structure, wherein it is shown here during its manufacture. A lower part has already been solidified to form component layers from solidified build material 13 (see e.g. FIG. 1) and the component layer SB currently being manufactured can be seen at the top. The layer segments S1, S2, S3, S4 concerning contour C, UpSkin US, DownSkin DS and InFill IF are still to be processed. It is to be noted here that the layer segments S1, S2, S3, S4 in this example do not necessarily represent continuous areas, but functionally different areas of the component layer SB. A layer segment S1 corresponds to the contour C, a layer segment S2 corresponds to the DownSkin DS, a layer segment S4 corresponds to the UpSkin US and a layer segment S3 corresponds to the InFill IF. The layer segments S1, S2, S3, S4 are each assigned work packages A1, A2, A3, A4, A5, A6, A7, A8.

The direction of an air flow LR is indicated at the top in the form of an arrow. Smoke that would be generated during manufacture of a work package A1, A2, A3, A4, A5, A6 thus blows to the top right in the drawing. It would therefore be advantageous to manufacture the work packages A1, A2, A3, A4, A5, A6 according to the processing direction indicated by an arrow at the bottom, since in this way no interference from smoke occurs. Thus, work package A6 at the top right should be produced first, followed by its neighboring work package A5 and the neighboring work package A4 thereof, and then the other three work packages in the same way.

However, conflicts could arise here if it is specified that UpSkin US and DownSkin DS layer segments S2, S4 must be processed first before the respective inner InFill IF can be irradiated. A possible graph for the processing sequence of layer segments S1, S2, S3, S4 could look as follows: S1→S2→S3→S4 and would basically represent a sequence relation R (see e.g. FIG. 5).

Figure 5:
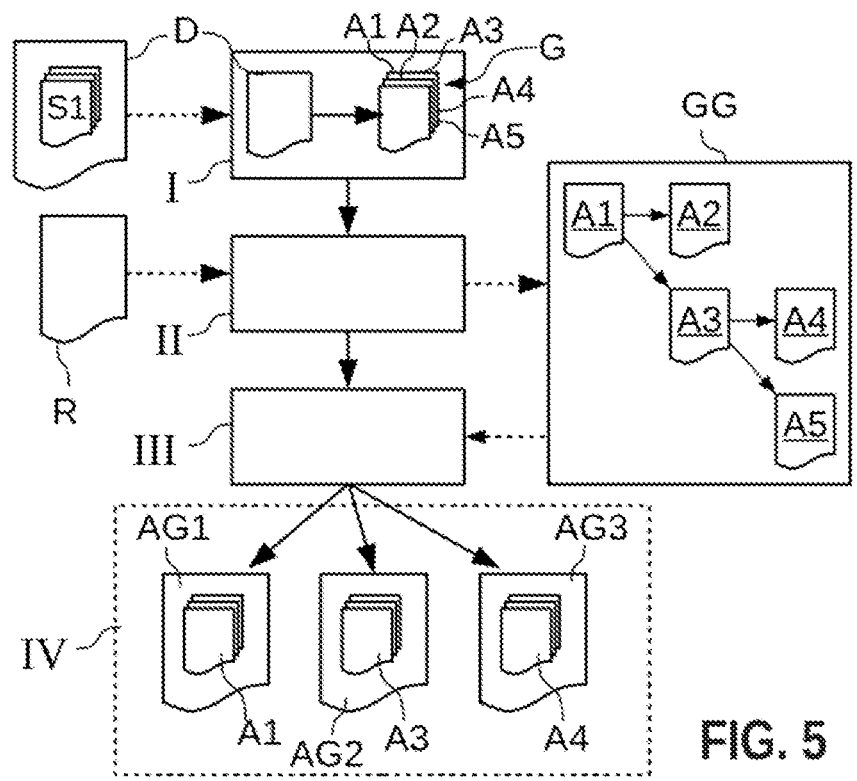
FIG. 5 shows a flowchart of an exemplary embodiment of a method according to the invention for generating an irradiation control data set, FIG. 6 a shows flowchart with a more detailed illustration of an exemplary embodiment of a method according to the invention for generating an irradiation control data set.

FIG. 5 shows a flowchart of an exemplary embodiment of a method according to the invention for generating an irradiation control data set BD.

Step I:

The layer data D, the generation of which is known in the prior art, serve as input data. These layer data D comprise, e.g., a geometric description of the melt traces to be run as well as an assignment to irradiation parameters (e.g. exposure parameters) and segments. These layer data D are divided into work packages A1, A2, A3, A4, A5, which form the basic set G. For each of these work packages, the time required for exposure can be determined.

Step II:

Dependencies between these work packages A1, A2, A3, A4, A5 are determined, which are stored as a simple directed graph GG. These dependencies are given by the sequence relation R, which can be considered as set of rules for creating the directed graph GG. In the graph GG illustrated, it can be seen that work package A1 must be processed first (left node) before work packages A2 and A3 can be processed (middle node); work packages A4 and A5 (right nodes) in turn depend on the processing of work package A3.

Step III:

Subsequently, work packages A1, A2, A3, A4, A5 are evaluated based on the graph GG, wherein only those work packages A1, A2, A3, A4, A5 are selected that can be processed, e.g. those for which all predecessors have already been processed or which have no predecessors, and these selected work packages are evaluated. Criteria that lead to a better part quality or a higher build rate can be used for evaluation.

Step IV:

Work packages A1, A2, A3, A4, A5 are distributed among irradiation resources in such a way that the order specified in the graph is taken into account. Since data sets are usually created first and irradiation resources are not directly controlled, the distribution is done by assigning the work packages A1, A2, A3, A4, A5 to work package groups AG1, AG2, AG3. For this purpose, the work package A1, A2, A3, A4, A5, which has been evaluated best, is assigned in each case.

For the output, the work packages A1, A2, A3, A4, A5 can be output as machine commands specific for an irradiation resource. After the assignment further computations can be performed, if necessary, in order to apply calibration values or coordinate transformations, e.g., specific for an exposure unit (laser).

For the assignment to the lasers and the processing rules, a number of nested rules can be applied, with which necessary conditions as well as preferred sequences and assignments are mapped:

Rule 1: Firmly defined sequence relation that must always be followed.

Rule 2 (optional): Sequence preferences of a user (for example, preferred exposure direction). If these preferences contradict rule 1, they are not taken into account.

Rule 3 (optional): Specifications regarding which work packages may be processed by which irradiation resource (work area, type of optics, spot size, laser power, etc., manually defined assignment), which are always fulfilled (if necessary, by inserting waiting times).

Rule 4 (optional): Once a laser has started the exposure of a component, all work packages belonging to these components are exposed by this laser first, to the extent possible. However, a new component may be started if it is necessary to wait for a work package that has to be exposed by another laser (e.g. due to rule 3).

Rule 5 (optional, where applicable): Specifications that determine the sequence in which the work packages are processed while complying with all previous conditions: Distance to the scanner, position along the smoke vent, spatial distance to the previous work package, number and/or duration of subsequent work packages.

Rule 6 (optional): Preferred assignment to a specific laser (e.g. according to the angle of impact). This is preferably only taken into account if the build time is extended at most by a specified tolerance.

Figure 6:
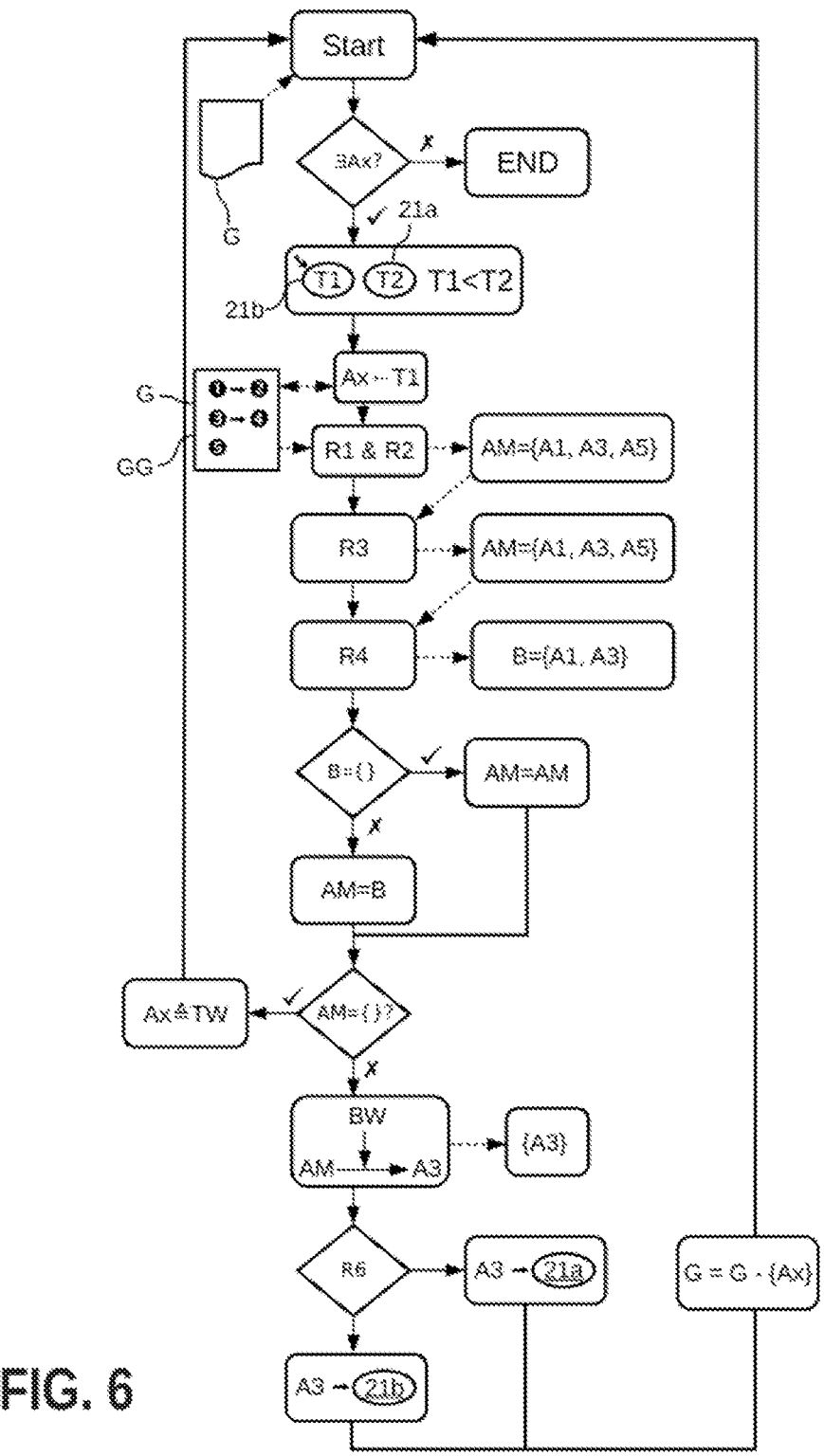

FIG. 6 shows a flowchart with a more detailed illustration of an exemplary embodiment for steps III and IV from FIG. 5. In the individual steps, symbols can be seen which characterize these steps.

The method starts at a starting point ("Start"), where a basic set G of work packages A1, A2, A3, A4, A5 is available (see, e.g., step I in FIG. 5). In this example, the method always returns to this starting point, wherein a current basic set (reduced by already assigned work packages) is always considered.

The next step ("∃Ax") checks whether there is still a work package Ax for which the following steps have not yet been performed. If no one is left ("x"), then the program ends, if there is still one, the following steps are performed. The method thus performed across all work packages Ax of the basic set G.

In the next step, the execution times T1, T2 of the irradiation resources 21a, 21b are determined and compared with each other. In the example shown, T1 is smaller than T2 (which can change with each new cycle) and the irradiation resource 21b is selected which has the execution time T1 (small arrow in the box). In this step, the irradiation resource 21a, 21b with the smallest execution time, i.e. with the earliest completion time, is always selected.

In the next step ("Ax←T1"), the work packages are determined that are no longer included in the basic set but are still in the graph GG. If the completion time of one of these work packages Ax is before the smallest execution time, it is deleted from the graph GG. This is indicated by the double arrow. It should be noted at this point that assigned work packages Ax are removed from the basic set G after their assignment (step "G=G−{Ax}"), but in this example they remain in the directed graph, for the time being. The advantage of performing this step is that it can also be taken into account here if at a point in time of the completion time that corresponds to the shortest execution time, the respective assigned work package Ax has already been processed (which is unlikely).

Alternatively, e.g., a list can be kept track of in which the already assigned work packages are assigned to their expected completion time. Work packages that are removed from the graph are also removed from this list, so that in a further cycle no further attempt is made to delete this work element from the graph.

In the following step, the directed graph GG from the work packages A1, A2, A3, A4, A5 is of the basic set G, in which in addition to rule 1 (necessary assignment rules R1) also rule 2 (user defaults R2) is taken into account, is now used to create a selection set AM. For this purpose, the predecessors of the graph are used, which are also in the basic set (assigned work packages Ax which still have to be processed are included in the graph and "block" their successors but are no longer included in the basic set). On the right there is an example of a filled selection set AM with set elements {A1, A3, A5}. Thus, for the irradiation resource with the earliest completion time, the set of work packages Ax for which all required work packages (rules 1 and 2) have already been completed at that time is determined, e.g., based on the graph GG.

In the subsequent step, rule 3 (assignment rules to irradiation resources R3) is used as a filter of the selection set AM, wherein a work package Ax is not included or removed again if it may not be irradiated by the selected irradiation resource 21b. In this example, all work packages A1, A2, A3, A4, A5 may be irradiated by all irradiation resources 21a, 21b and the selection set AM remains unchanged. Thus, from the selection set AM, the set A' of work packages that may be processed according to rule 3 by the irradiation resource is determined and this set A' is the new selection set AM.

In the following step, the optional rule 4 (assignment rules to a component R4) is applied as a filter of the selection set AM. In this example, work package A5 could not be included or removed again because it is not in contact with the respective component. To the right, the subset B is shown which comprises only the elements {A1, A2} and could be the result of rule 4.

The modification of the selection set according to rule 4 can be achieved with the following steps, in which it is checked whether the subset B is empty ("B={ }") and if yes, the selection set remains unchanged ("AM=AM"), or if no, the subset B is regarded as a new selection set ("AM=B").

Afterwards it is checked in a step if there is any element remaining in the selection set AM ("AM={ }"). Should the selection set be empty, a wait time is inserted into the work package group in place of a work package (which can be treated like a work package or a wait command, hence "Ax≜TW"). It is preferred that the duration of the wait time is such that the next work package is completed. If the selection set is not empty, i.e. selected work packages are present, the method proceeds and reaches step IV of FIG. 5.

In the next step, the work packages Ax of the selection set AM are evaluated based on a set of evaluation rules (see, e.g., rule 5). In the example shown, work package A3 is selected. This work package A3 could now be assigned to the work package group of irradiation resource 21b. In the example shown here, however, an additional optimization step takes place prior this.

If the evaluation is based on rule 5, the work packages Ax in question are preferably evaluated according to different criteria, e.g. the distance to the scanner, the position along the smoke vent, the distance to the previous work package, the duration and or number of work packages that are required for the work package under consideration. The different criteria are combined to an evaluation number and the individual criteria are preferably weighted with selectable factors (weighting factors). The work package with the best evaluation is selected for allocation.

Within this optimization step, it is checked according to rule 6 whether another irradiation resource 21a would even be better suited for the processing of work package A3, e.g. due to the angle of incidence. If this is the case, work package A3 is assigned to the other irradiation resource 21a or the work package group thereof, otherwise to the originally selected irradiation resource 21b.

The assigned work package Ax (here, work package A3) is deleted from the basic set in the step "G=G−{Ax}", so that it is not assigned twice.

In this example, the assignment is repeated until all work packages have been assigned.

Figure 7:
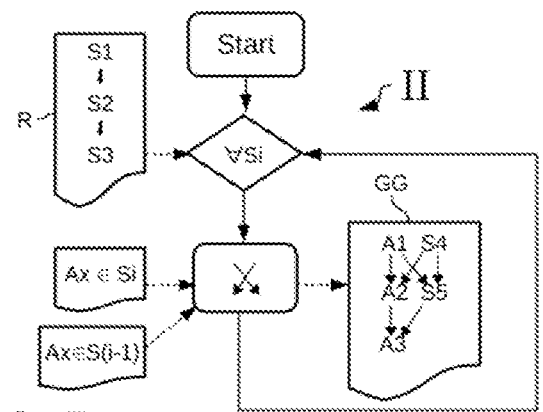
FIG. 7 shows a flowchart of an exemplary embodiment for creating a directed graph, FIG. 8 a flowchart of an exemplary embodiment for creating another directed graph.

FIG. 7 shows a flowchart of an exemplary embodiment for creating a directed graph GG without considering the topology. Constructing such a dependency graph can be done on the basis of pure affiliation to specific areas. A list containing layer segments S1, S2, S3 in the desired sequence is used as input. This list can be regarded as a sequence relation R (see, e.g., FIG. 5, where this method could be performed in step II). The individual layer segments Si from this list are now considered.

All segments starting with the second entry in the list are looped ("∀Si").

For each work package Ax belonging to the previous segment Si-1 (list: "Ax∈S(i-1)"), an edge to all work packages belonging to the currently considered segment Si (list: "Ax∈Si") is entered in the graph GG. This assignment is symbolized by two crossed arrows in the respective box.

Figure 8:
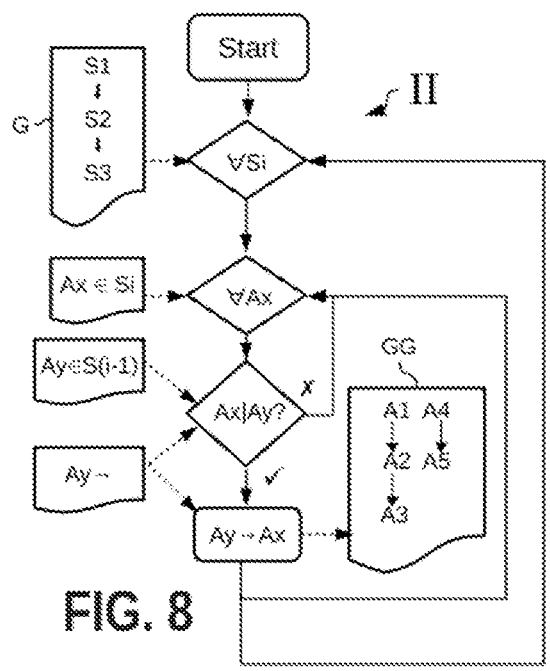

FIG. 8 shows a flowchart of an exemplary embodiment for creating another directed graph GG where the relations are restricted to topologically connected regions. This method could also be carried out in step II of FIG. 5. The advantage here is that the number of dependencies between the work packages Ax are reduced so that there are more possibilities to divide the work packages Ax among the irradiation resources. Similar to FIG. 7, individual layer segments Si are considered from a list containing layer segments S1, S2, S3 in the desired sequence and all layer segments Si starting with the second entry in the list are looped ("∀Si").

For each work package Ax belonging to the considered layer segment Si (list: "Ax∂Si"), work packages Ay (list: "Ax∈S(i-1)") from the previous layer segment Si-1 that are adjacent to Ax ("Ax|Ay") are determined. For all work packages Ay, an edge is added to work package Ax in the graph GG. In doing so (list: "Ay→"), a list with adjacent precursors of work packages Ay is used. In this variant too, the graph GG is always free of cycles.

In the case of the irradiation sequence, there may be further preferences, possibly conflicting with the already specified relative sequence between the work packages. For example, to avoid laser/smoke interactions, it can be required that the work packages be exposed in the direction counter to the flow direction.

Figure 9:
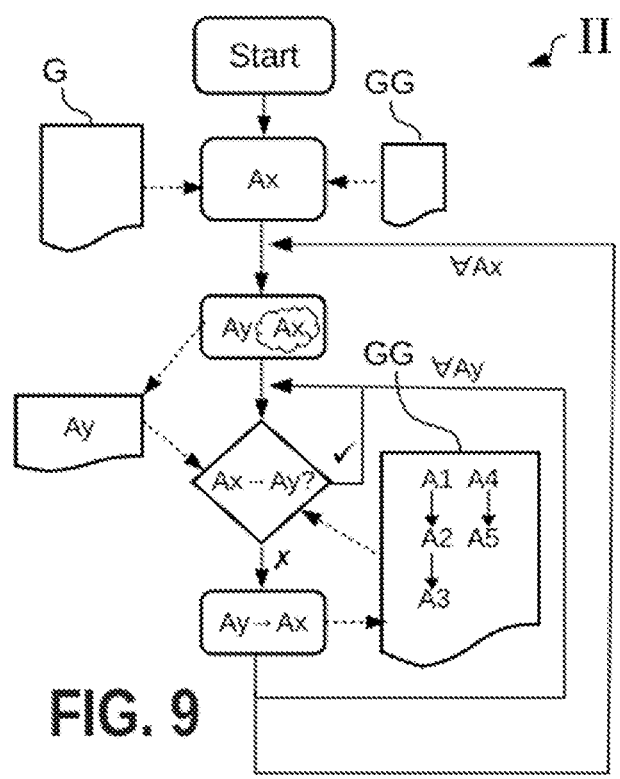
FIG. 9 shows a flowchart of an exemplary embodiment for creating another directed graph.

FIG. 9 shows a flowchart of an exemplary embodiment for creating another directed graph GG. This method could also be carried out in step II of FIG. 5. This flowchart describes an algorithm that adds dependencies for work packages in an area potentially shaded by smoke to a directed graph GG, provided this does not result in a contradiction. The input is a basic set G with all work packages Ax and the directed graph GG which already contains all mandatory dependencies, e.g. due to the exposure sequence of the layer segments. For the representation, the basic set from FIG. 5 was used, wherein N work packages Ax, with N>>1 should be envisaged here. For each of the N work packages Ax ("∀Ax"), all work packages Ay are determined which are potentially shaded by smoke during the exposure of work package Ax.

The process runs through all shadowed work packages ("∀Ay"), and for each work package Ay it is checked whether a previous exposure of work package Ax is required. Only if this is not the case, an edge from work package Ay to work package Ax is added to graph GG.

Finally, it is again pointed out that the figures described in detail above are merely exemplary embodiments which may be modified in various ways by those skilled in the art without departing from the scope of the invention. Furthermore, the use of the indefinite articles "a" or "an" does not exclude the possibility that the respective features can also be present more than once. Likewise, the term "unit" does not exclude that it consists of multiple interacting subcomponents which, where appropriate, may also be spatially distributed.

REFERENCE LIST 1 device for additive manufacturing/laser sintering device
2 manufacturing product/component
3 process space/process chamber
4 chamber wall
5 container
6 container wall
7 working plane
8 build area
10 support
11 base plate
12 build platform
13 build material
14 storage container
15 build material
16 coater
17 radiation heater
20 irradiation device/exposure device
21a, 21b irradiation resource
22a, 22b radiation source/laser
23a, 23b deflection device/scanner
24a, 24b focusing device
25 coupling window
30 control device
31 control strategy modification unit
32 data interface
33 measurement signal interface
34 measurement signal evaluation unit
35 interface
36 control interface
37 storage
40 sensor arrangement/camera
50 bus
60 terminal
100 control data generation device
101 assignment unit
A1, A2, A3, A4, A5, A6, A7, A8, Ax, Ay work package
AM selection set
BD irradiation control data set
BR processing direction
BS irradiation control data
BW set of evaluation rules
C contour
D layer data
DS DownSkin
F manufacturing process
FR functional feedback
H horizontal direction
HS Heating control data
IF InFill
L laser beam
LR direction of air flow
M area centroid
MS measurement signal
P work package
PS process control data
R sequence relation
S layer
SB component layer
S1, S2, S3, S4, S5 layer segment
SD coating control data
ST irradiation strategy
T1, T2 execution time
TS support control data
TW waiting time
US UpSkin
V vertical direction

The invention claimed is:

1. A method for generating an irradiation control data set for creating control data for a device for additive manufacturing of a number of components in a manufacturing process in which at least one layer of a build material is introduced into a process space and the build material of the layer is selectively solidified to form at least one component layer by irradiating at least one section of the layer using a plurality of irradiation resources, the method comprising the steps:

a) providing layer data comprising data on build-up of layer segments for a component layer;
b) dividing the layer data into multiple work packages while forming a basic set of the work packages;
c) providing a firmly defined sequence relation for layer segments or for the work packages;
d) specifying a processing sequence of the work packages based at least on the sequence relation;
e) determining an execution time for each of the irradiation resources for a respective work package group of the work packages which have previously been assigned to the irradiation resources;
f) selecting an irradiation resource taking into account the execution time determined for the irradiation resource;
g) determining a selection set of work packages from the basic set of work packages based on the sequence relation, the selection set comprising those work packages which can be processed according to the processing sequence;
h) selecting a work package from the selection set taking into account a specified set of evaluation rules;
i) assigning the selected work package to a work package group which is assigned to the selected irradiation resource and removing the selected work package from the basic set of work packages; and j) repeating at least steps d) to i) until a predetermined termination criterion is reached.

2. The method according to claim 1, wherein the work packages additionally comprise defined irradiation parameters, and wherein the method further comprises the steps:
providing an assignment relation for assigning irradiation parameters to the irradiation resources,
filtering the selection set of work packages based on the assignment relation and the assigned irradiation parameters depending on the selected irradiation resource.

3. The method according to claim 1, wherein the set of evaluation rules comprises an evaluation for at least one criterion of the group
spatial distance of the work package from the selected irradiation resource,
number of work packages that depend on the execution of the work package,
position of the work package relative to a spatial extent of a determined or predefined smoke extraction area,
spatial distance of the work package relative to a previously assigned work package,
duration of the work packages which require the respective work package, and
distance of beams of the irradiation resources from each other,
wherein based on the set of evaluation rules, a respective evaluation value is calculated, wherein the set of evaluation rules is configured in such a way that it assigns a numerical value to the at least one criterion,
wherein different weightings are additionally assigned to different criteria and/or the set of evaluation rules assigns different numerical weightings to criteria.

4. The method according to claim 1 further comprising:
checking whether the selected work package can also be irradiated by another irradiation resource and whether the other irradiation resource is better suited for executing the work package with respect to an angle of incidence or angle of deflection of a beam of the irradiation resource and/or a spatial distance of the irradiation resource from the work package, wherein if the other irradiation resource is better suited, the other irradiation resource becomes the selected irradiation resource and an assignment of the selected work package to a work package group which is assigned to the currently selected irradiation resource takes place,
wherein the execution times of the respective irradiation resources without the respective work package are compared with one another and a change of the selected irradiation resource takes place in the case where the respective execution times differ at most by a predetermined time span.

5. The method according to claim 1, wherein the evaluation control system comprises a cost function and evaluation values of the work packages is determined in the course of an optimization of this cost function, wherein the cost function comprises
a completion time and/or
the execution times and/or
criteria and/or a relevance assignment and
wherein a determination of the evaluation values is performed by an iterative optimization of the completion time.

6. The method according to claim 1,
wherein specifying the processing sequence of the work packages is additionally carried out according to a user specification,
wherein only user specifications are taken into account which satisfy the sequence relation, and
wherein the user specification comprises a specification for a feed direction and/or a specification for an assignment of an irradiation resource to a component.

7. The method according to claim 1, comprising the steps:
determining whether work packages of the selection set and work packages already assigned to the currently selected irradiation resource have an affiliation to the same component, and if so, creating a new selection set comprising the determined work packages of the selection set which have the respective affiliation.

8. The method according to claim 1,
wherein for specifying the processing sequence, the work packages are arranged, based on the sequence relation, in a simple directed graph, and wherein, when determining the selection set of work packages from the basic set of work packages, only the work packages arranged in the simple directed graph are used for the processing, and none of the work packages of the graph has to be processed beforehand,
wherein the basic set of the work packages is or comprises the simple directed graph.

9. The method according to claim 1, wherein in the case that no work packages can be found for the selected irradiation resource, but work packages are present that are not yet processed, the selected irradiation resource is assigned a predetermined waiting time instead of a work package.

10. An irradiation control data set that has been generated by a method according to claim 1.

11. A method for additive manufacturing of at least one component layer of at least one component, comprising the steps:
introducing a layer of a build material into a process space;
selectively solidifying the build material of the layer by irradiating at least one section of the layer by a plurality of irradiation resources; and
controlling the irradiation resources by control data which have been generated using an irradiation control data set according to claim 10.

12. A computer-readable storage medium including control data for controlling a device for additive manufacturing, the control data being configured such that the device for additive manufacturing is controlled in such a manner that manufacturing a component is performed using a method according to claim 11.

13. A computer-readable storage medium storing a computer program product comprising a computer program, the computer-readable storage medium being directly loadable into a control data generating device and/or a control device of a device for additive manufacturing of a component layer of a component, the computer program comprising program sections to carry out all steps of the method according to claim 1 when the computer program is executed in the control data generating device and/or the control device.

14. A control data generation device for generating an irradiation control data set for creating control data for a device for additive manufacturing of at least a number of components in a manufacturing process in which at least one layer of a build material is introduced into a process space and the build material of the layer is selectively solidified to form component layers by irradiating at least one section of the layer using a plurality of irradiation resources, comprising an assignment unit adapted for:
a) processing provided layer data comprising data on build-up of layer segments for a component layer;

b) dividing of the layer data into multiple work packages while forming a basic set of the work packages;
c) providing a firmly defined sequence relation for layer segments) or for the work packages;
d) specifying a processing sequence of the work packages based at least on the sequence relation;
e) determining an execution time for each of the irradiation resources for a respective work package group of the work packages which have previously been assigned to the irradiation resources;
f) selecting an irradiation resource taking into account the execution time determined for the irradiation resource with the shortest execution time determined in each case;
g) determining a selection set of work packages from the basic set of work packages based on the sequence relation, the selection set comprising those work packages which can be processed according to the processing sequence;
h) selecting a work package from the selection set, taking into account a specified set of evaluation rules;
i) assigning the selected work package to a work package group which is assigned to the selected irradiation resource and removing the selected work package from the basic set of work packages; and
j) repeating at least steps d) to i) until a predetermined termination criterion is reached.

15. A device for additive manufacturing of at least one component layer of at least one component in an additive manufacturing process, comprising at least one supply device for introducing a layer of a build material into a process space, a plurality of irradiation resources for selectively solidifying the build material of the layer by irradiating at least one section of the layer, and a control data generating device according to claim 14.

* * * * *